(12) United States Patent
Rosenboom (10) Patent No.: US 8,528,657 B1
(45) Date of Patent: Sep. 10, 2013

(54) FOLDING AGRICULTURAL TOOL CARRIER HAVING COMPACT STORAGE POSITION

(76) Inventor: Lyn Rosenboom, Clifton, IL (US)

( * ) Notice: Subject to any disclaimer, the term of this patent is extended or adjusted under 35 U.S.C. 154(b) by 0 days.

(21) Appl. No.: 13/422,835

(22) Filed: Mar. 16, 2012

(51) Int. Cl.
*A01B 49/00* (2006.01)

(52) U.S. Cl.
USPC .......................................... 172/311

(58) Field of Classification Search
USPC .............. 172/311, 456, 452, 1; 111/54, 120, 111/20, 57, 59; 56/192, 367, 370
See application file for complete search history.

(56) References Cited

U.S. PATENT DOCUMENTS

| | | | |
|---|---|---|---|
| 3,493,246 A | 2/1970 | Tassett et al | |
| 3,493,247 A | 2/1970 | Tassett et al | |
| 3,548,954 A * | 12/1970 | Lindemann | 172/311 |
| 3,620,550 A | 11/1971 | Hornung | |
| 3,791,673 A | 2/1974 | Hornung | |
| 4,126,189 A * | 11/1978 | Channel | 172/456 |
| 4,204,575 A * | 5/1980 | Richardson et al. | 172/1 |
| 4,232,747 A * | 11/1980 | Pfenninger et al. | 172/311 |
| 4,529,040 A * | 7/1985 | Grollimund | 172/311 |
| 4,576,238 A | 3/1986 | Spencer | |
| 4,896,732 A * | 1/1990 | Stark | 172/311 |
| 5,024,279 A | 6/1991 | Warner et al. | |
| 5,255,756 A * | 10/1993 | Follmer et al. | 180/401 |
| 5,577,563 A * | 11/1996 | Holen | 172/456 |
| 5,687,798 A * | 11/1997 | Henry et al. | 172/311 |
| 5,740,870 A * | 4/1998 | Rodgers et al. | 172/456 |
| 5,921,325 A * | 7/1999 | Meek et al. | 172/311 |
| 6,035,942 A * | 3/2000 | Smith et al. | 172/311 |
| 6,035,943 A * | 3/2000 | Gerein et al. | 172/328 |
| 6,112,827 A * | 9/2000 | Reiber et al. | 172/311 |
| 6,202,756 B1 * | 3/2001 | Hundeby et al. | 172/311 |
| 6,205,937 B1 | 3/2001 | Shoup | |
| 6,269,886 B2 * | 8/2001 | Friggstad | 172/311 |
| 6,293,352 B1 * | 9/2001 | Hundeby et al. | 172/456 |
| 6,305,478 B1 * | 10/2001 | Friggstad | 172/458 |
| 6,374,921 B1 | 4/2002 | Friggstad | |
| 6,374,923 B1 * | 4/2002 | Friggstad | 172/383 |
| 6,397,953 B1 * | 6/2002 | Ankenman | 172/445.1 |
| 6,408,950 B1 | 6/2002 | Shoup | |
| 6,415,873 B1 * | 7/2002 | Hudgins | 172/311 |
| 6,561,283 B2 * | 5/2003 | Hundeby | 172/459 |
| 6,675,907 B2 * | 1/2004 | Moser et al. | 172/311 |
| 6,702,035 B1 * | 3/2004 | Friesen | 172/311 |
| 6,902,010 B2 * | 6/2005 | Shoup | 172/456 |

(Continued)

OTHER PUBLICATIONS

WR Assembly/Operator'S Manual, Folding Toolbar, WIL-RICH, Jul. 2009, USA Cover page and pp. 12, 51-54.

*Primary Examiner* — Árpád Fábián-Kovács
(74) *Attorney, Agent, or Firm* — Duane A. Coordes; Philip L. Bateman (57) ABSTRACT

A folding agricultural tool carrier for supporting tillage, seeding, fertilizer or other ground engaging tools. On each side of a carrier frame a boom support frame is hinged for pivoting about a fore-and-aft axis, and a wing frame or boom is pivotally connected to the boom support frame forwardly of the aft end of the carrier frame and adjacent wheel structure supporting the carrier. A rear fold cylinder pivots the boom forwardly from an extended position to a flat-fold position alongside the boom support frame, and a torque resisting and fatigue reducing diagonal brace flat-folds between boom and the support frame. Frame cylinders pivot the support frame and folded boom and brace into a narrow transport position over the carrier frame. A wheel accommodation space is defined between support frame hinges to facilitate tread adjustments.

10 Claims, 6 Drawing Sheets

(56) References Cited

U.S. PATENT DOCUMENTS

| | | |
|---|---|---|
| 7,073,604 B1 * | 7/2006 | Dobson et al. ............... 172/311 |
| 7,380,892 B2 | 6/2008 | Rosenboom |
| 7,549,482 B2 * | 6/2009 | Wake et al. .................. 172/311 |
| 7,562,719 B1 * | 7/2009 | Misenhelder et al. ........ 172/456 |
| 7,581,597 B2 * | 9/2009 | Neudorf et al. .............. 172/311 |
| 7,712,544 B1 | 5/2010 | Misenhelder et al. |
| 7,726,749 B2 | 6/2010 | Rosenboom |
| 7,740,084 B2 | 6/2010 | Rosenboom |
| 7,827,774 B2 * | 11/2010 | Dow et al. .................... 56/192 |
| 7,854,273 B2 | 12/2010 | Friggstad et al. |
| 7,921,932 B2 | 4/2011 | Poole |
| 2002/0005629 A1 | 1/2002 | Rosenboom |
| 2005/0087350 A1 | 4/2005 | Bauer |
| 2010/0126743 A1 | 5/2010 | Poole et al. |

* cited by examiner

FOLDING AGRICULTURAL TOOL CARRIER HAVING COMPACT STORAGE POSITION

FIELD

The present disclosure relates to a folding carrier for supporting agricultural tools.

SUMMARY

The carrier includes a boom support frame pivotally connected to a carrier frame for pivoting about a fore-and-aft frame axis between a working position outwardly of the carrier frame and a narrow inwardly directed storage position above the carrier frame. An elongated tool support boom or wing beam is connected by reinforced hinge structure to the boom support frame for pivoting about a boom axis which is upright when the boom support frame is in the working position in the field. An activator connected to the boom support frame and to the tool support boom pivots the boom outwardly about the boom axis towards an extended position when the boom support frame is in the working position and inwardly from the extended position to a fore-and-aft flat-folded position adjacent the carrier frame. The boom support frame with the folded boom pivots upwardly above the carrier frame to lift the boom and supported tools upwardly and inwardly over the carrier frame.

The support frame may be constructed to extend along all or a substantial portion of the side of the carrier frame to provide a sturdy support with spaced hinges and facilitate mounting and pivoting of a diagonal boom brace. In one embodiment, an articulated diagonal brace may be provided between the boom and the boom support frame which collapses compactly into itself between the boom and support frame prior to the upward pivoting of the boom and support frame. Use of an elongated support frame permits the brace to be conveniently rotated with the boom support frame and boom upwardly into the storage position without need for cumbersome linkages or complicated joints or the disconnection of components. The diagonal brace may also be used to provide increased torque resistance to the boom or wing beam and may include hinge structure that reduces the stress on the brace as the boom flexes and twists relative to the boom support frame.

In a possible embodiment, the boom support frame includes an offset defining with the side of the carrier frame a fore-and-aft extending wheel structure accommodation space receiving wheel structure such as tracks, belts, multiple wheels or any other suitable ground support structure. The accommodation space has dimensions larger than the envelope of the wheel structures and accommodates different sizes and types of the wheels, tracks, and tires. The space facilitates adjustments of the wheel or track tread and provides more convenient access to the wheel structure and to adjacent areas.

The boom or wing axis may be located adjacent the wheel structure at the innermost end of the tool support boom. Reinforced hinge structure may include torque-resisting plates receiving the innermost end of the tool support boom and sandwiching the end between the plates. Additional boom torque resistance may be provided by extending a torque tube through the beam and securing the torque tube to the innermost and outermost ends of the boom. The innermost end of the tube may be secured within the reinforced hinge.

To reduce overall width in the folded position of the boom, the boom pivot may be offset in a direction of travel from an aft end of the carrier, and the activator may comprise a hydraulic cylinder connected at a cylinder end to the boom support frame. In this configuration, the cylinder may be extended to rotate the tool support boom towards the folded position and assume a flat-fold position approaching a parallel condition with the boom for compactness. The above-described flat-fold arrangement of the activator and boom also tends to distribute more of the weight of the booms and mounted tools forwardly on the carrier frame and helps balance the weight distribution more evenly, which is particularly useful when a rear mounted toolbar with rearwardly projecting tools is connected to the aft end of the carrier frame. Wheel scuffing when the carrier is turned from the forward direction may be reduced by positioning the boom pivot adjacent the wheel structure.

In another possible configuration, boom support wheels may support the boom above the ground in the extended position and may include a wheel axis located adjacent the fore-and-aft frame axis when the tool support beam is in the folded position. In this configuration, the wheels may be lifted upwardly with pivoting of the boom support frame towards the storage position, and the close proximity of the frame and wheel axes provides improved mechanical advantage and weight distribution for reducing component stresses and the force required for the pivoting of the boom support frame. The axis of the boom support wheels may lie close to or in a plane that passes through the boom pivot to reduce scuffing when the boom is pivoted towards the transport position.

DETAILED DESCRIPTION

Figure 1:
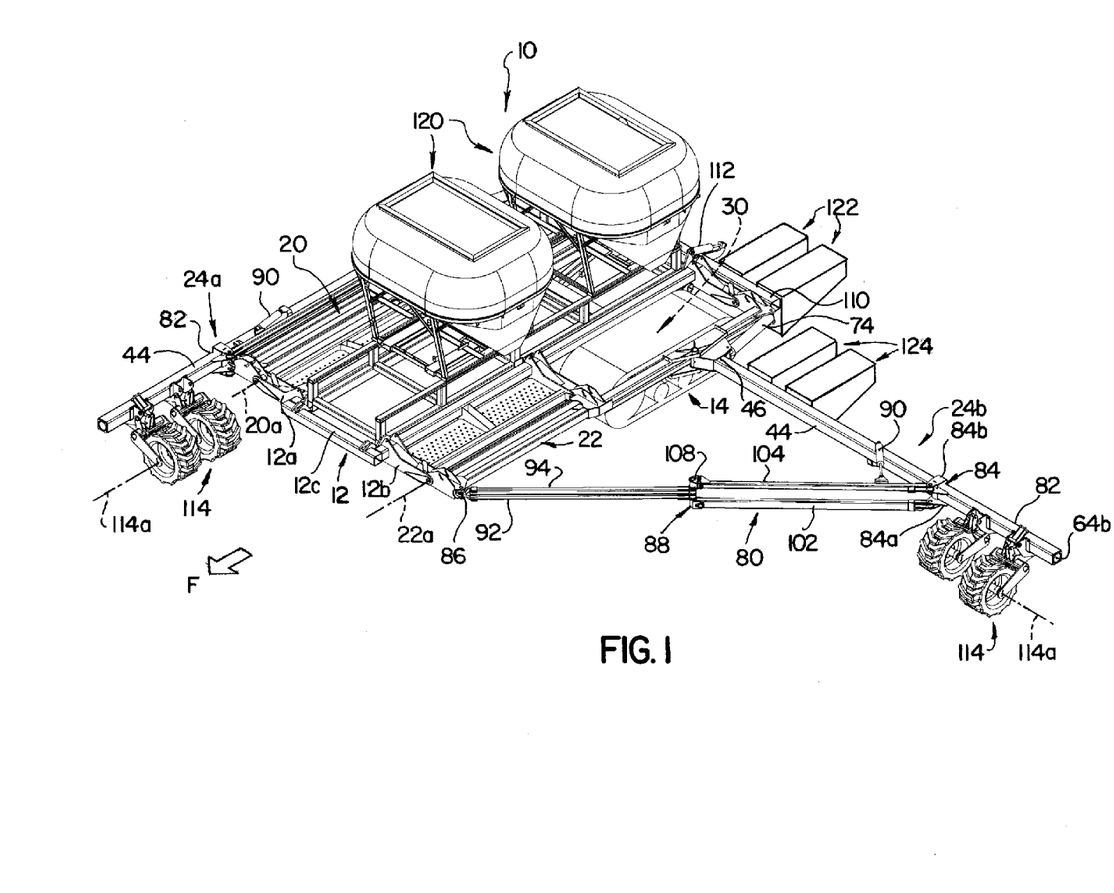
FIG. 1 is a front perspective view of a tracked implement carrier in a partially folded condition.
Figure 2:
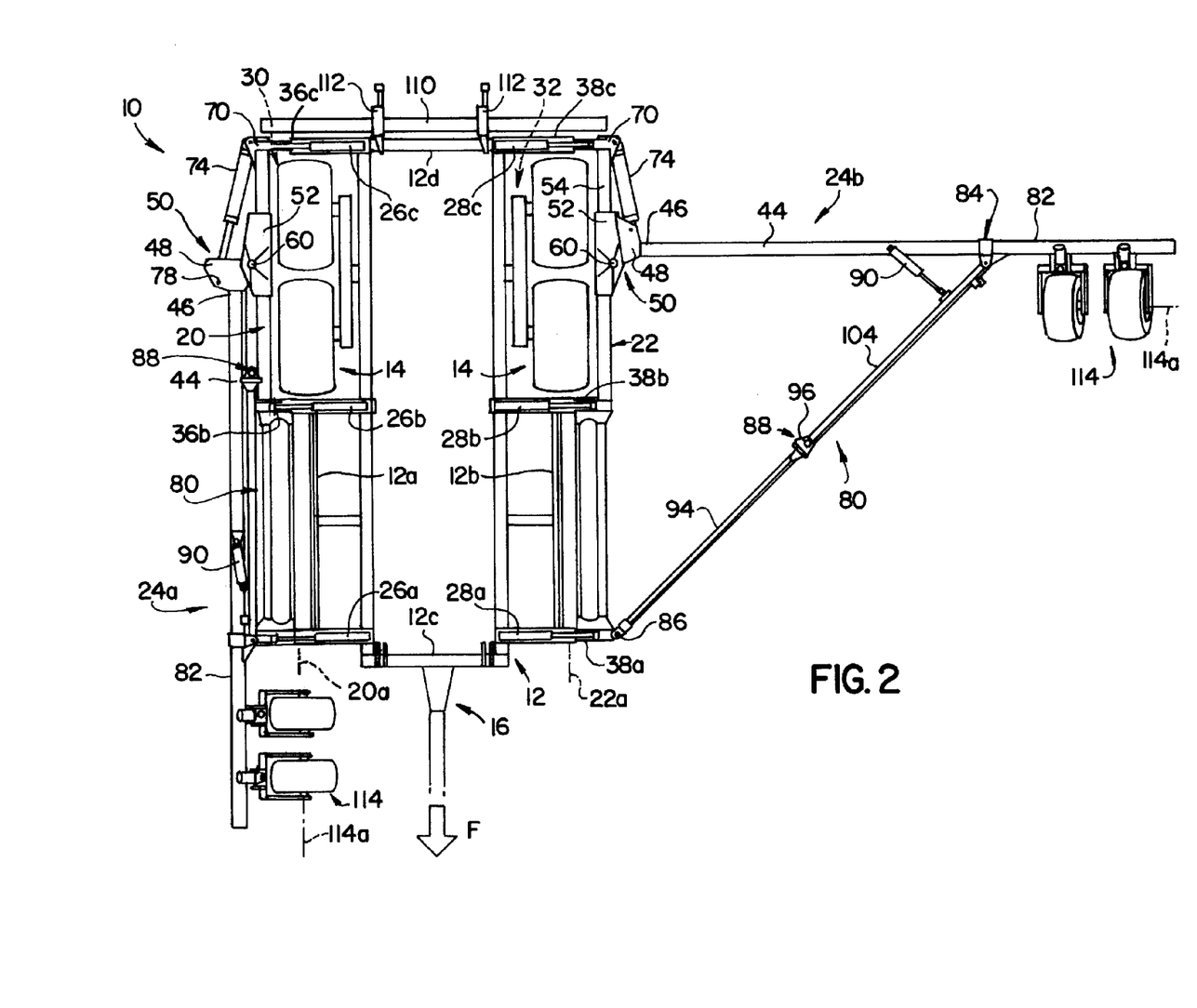
FIG. 2 is a top view of an implement carrier in the partially folded condition similar to the carrier in FIG. 1, but having ground wheels rather than tracks.

Referring to FIGS. 1 and 2, therein is shown an agricultural implement carrier 10 including a fore-and-aft extending and generally rectangular central carrier frame 12. The frame 12 has opposite sides 12a and 12b and forward and aft ends 12c and 12d. The frame 12 is supported by wheel structures 14 at rearward locations adjacent the sides 12a and 12b. The wheel structures 14 may be of any suitable configuration, including but not necessarily limited to tracks (FIG. 1), tandem wheels, and walking-beam supported wheels (FIG. 2) or other offset types of wheels, and may be transversely adjustable to vary tread. Hitch structure 16 (FIG. 2) adapted for connection to a towing vehicle (not shown) is supported at the forward end 12c of the carrier frame 12 for moving the carrier 10 in a working direction F.

Boom support frames 20 and 22 are pivotally connected to the carrier frame sides 12a and 12b for pivoting about corresponding fore-and-aft frame axes 20a and 22a. The frames 20 and 22 support right- and left-hand (as viewed in the working direction F) pivoting wing frame assemblies 24a and 24b, respectively. In FIGS. 1 and 2, the left-hand wing frame assembly 24b is shown in the fully extended field-working position, and the right-hand wing frame 24a is shown in a folded position adjacent the side 12a.

Figure 3:
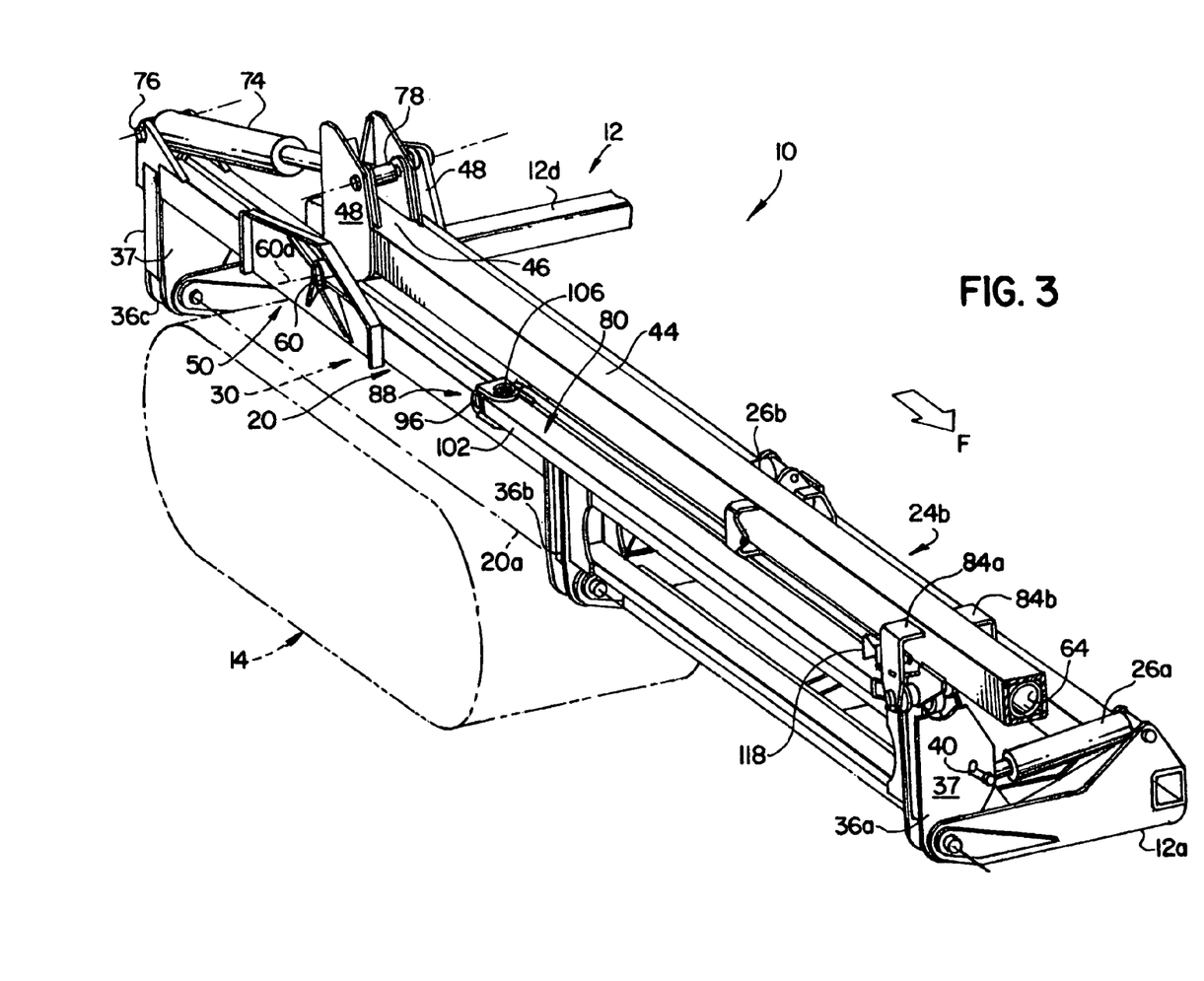
FIG. 3 is an enlarged front perspective view of a portion of the carrier of FIG. 1 showing a boom support frame and tool support boom approaching a fully folded position and illustrating a compact flat-fold transport configuration and an accommodation space provided for wheel structure by the frame structure.
Figure 5:
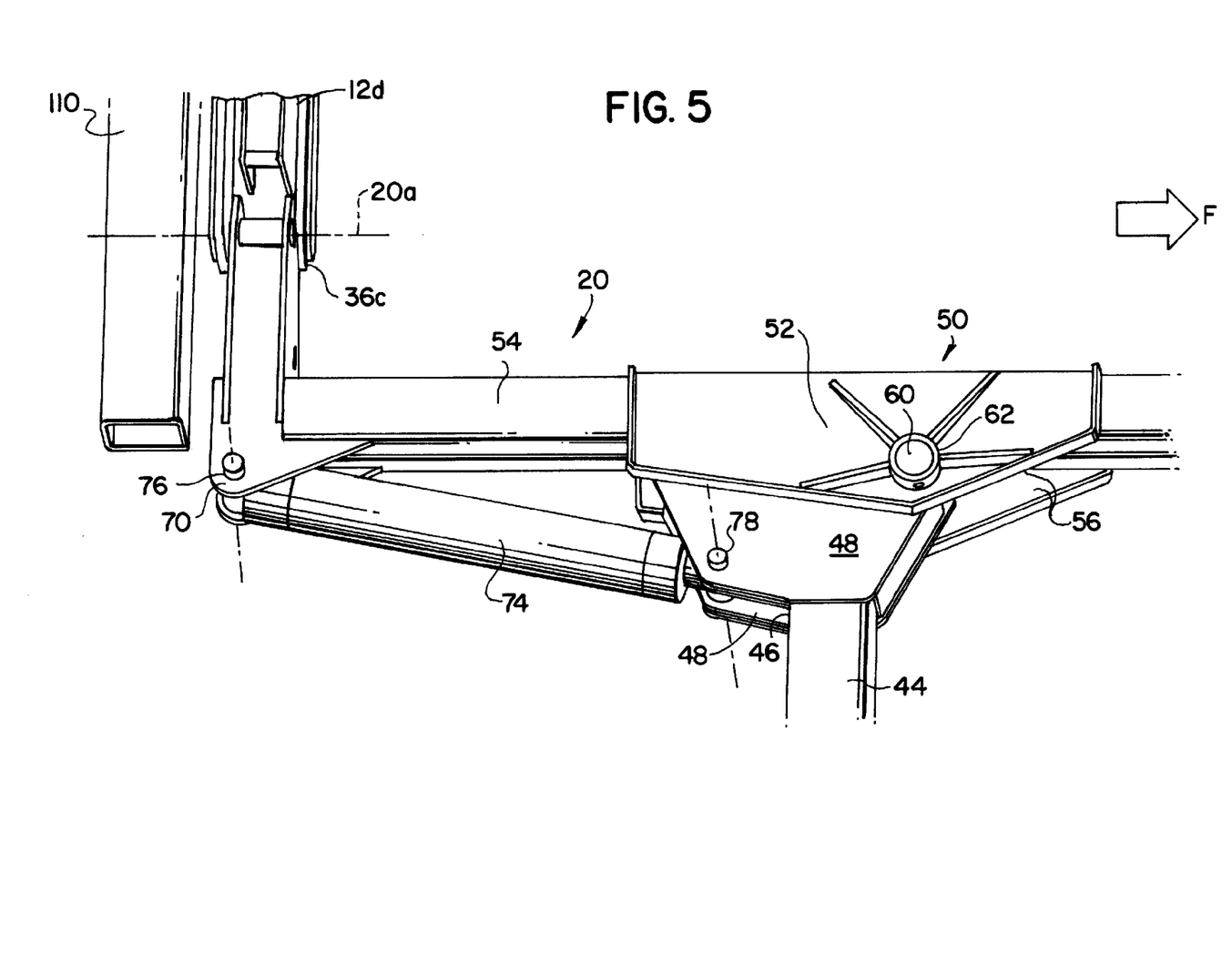
FIG. 5 is a top enlarged perspective view of the pivot area of one side of the implement carrier of FIG. 1 showing the boom support frame pivoted downwardly to the working position with the fold cylinder retracted so the tool support boom is in the extended position and illustrating the solid torque-resisting configuration of the boom hinge.
Figure 6:
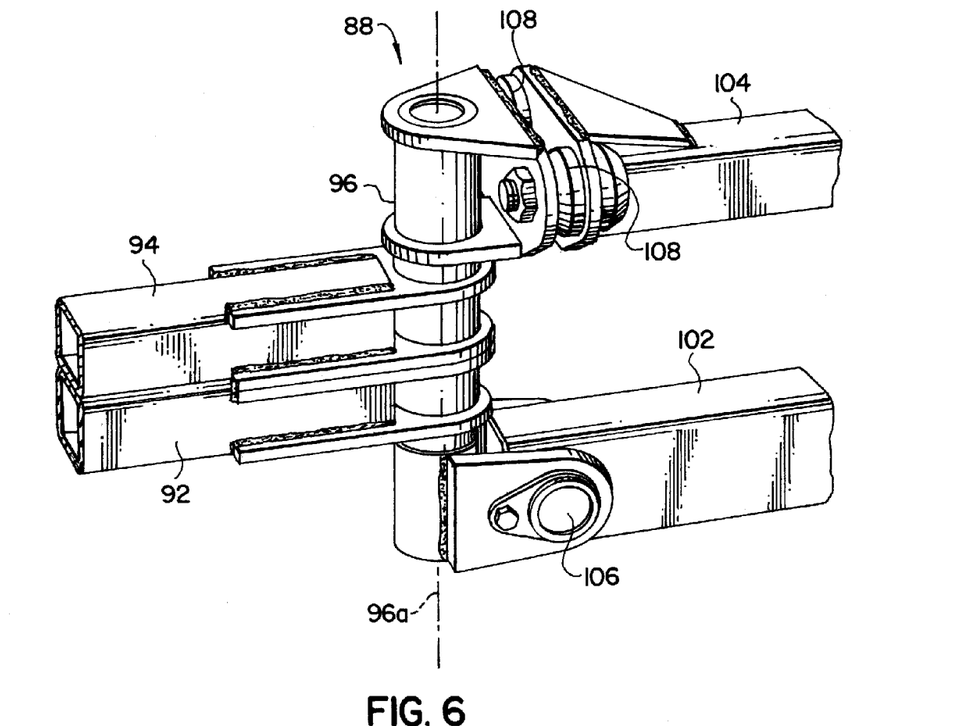
FIG. 6 is an enlarged front perspective view of the central portion of the diagonal brace in an extended working position and illustrating joint structure for accommodating misalignment between the tool support boom and the boom support frame.

Fore-and-aft spaced frame cylinders 26a, 26b and 26c (FIGS. 2 and 3) are connected between the carrier frame 12 and the boom support frame 20 for pivoting the frame 20 about a frame axis 20a between a working position outwardly of the carrier frame as shown in FIG. 5 and an upwardly and inwardly directed storage position above the carrier frame 12 and the wheel structure 14 (FIG. 3). Similarly, frame cylinders 28a, 28b and 28c are connected between the carrier frame 12 and the boom support frame 22 for pivoting the frame 22 about a frame axis 22a.

As shown, rearwardmost cylinders 26b, 26c and 28b, 28c are located at opposite ends of wheel structure accommodation spaces indicated generally at 30 and 32, respectively, and the forward cylinders 26a, 28a are supported near a forwardmost extremity of the carrier frame 12. Reinforced hinge structures 36a, 36b and 36c connected to the carrier frame side 12a and to the boom support frame 20 define the frame axis 20a about which the boom frame 20 rotates and include slotted plates 37 (FIG. 3) with slots 40 receiving the respective rod ends of the cylinders 26a, 26b and 26c. The slots allow some pivoting of the boom support frame 20 independently of cylinder action when the cylinders 26a, 26b and 26c are fully extended in the field so that the implement can flex. A similarly constructed and operated set of hinge structures 38a, 38b and 38c are connected to the opposite frame side 12b to define the opposite frame axis 22a about which the boom support frame 22 pivots.

Each of the accommodation spaces 30 and 32 generally is located above the corresponding wheel structure 14 and extends beyond the extremities of the wheel structure to accommodate different sizes, types and positional adjustments of the wheel structure within the space. Also, if desired, the carrier frame 12 may be raised or lowered on the wheel structure 14, and the accommodation spaces 30 and 32 eliminate interference between the frame and the wheel structure during such vertical adjustments.

To establish the spaces 30 and 32, U-shaped offsets are located in the sides 12a and 12b of the carrier frame between the respective rear and center hinge pairs 36c, 36b and 38c, 38b. As best seen in FIGS. 1-3, the corresponding boom support frames 20 and 22 include mating offsets opening towards the offsets in the sides 12a and 12b. Extending the frame cylinders 26a-26c and 28a-28c rotates the boom support frames 20 and 22 downwardly and outwardly from the storage position (FIG. 3) to the working position (FIGS. 1 and 2), and the mating offsets define the spaces 30 and 32 which are generally open above the entire envelopes of the wheel structures 14. In the storage positions, all or a substantial portion of the boom support frames 20 and 22 may be located inwardly of the outermost extremities of the wheel structures 14 for narrow transport and more central weight distribution, and the offsets in the boom support frames 20 and 22 provide additional vertical clearance for transport and access to areas around the wheels or tracks.

The boom support frames 20 and 22 may be constructed as shown in FIGS. 1 and 2 to extend along all or a substantial portion of the sides 12a and 12b of the carrier frame and provide a sturdy support with hinges (36a-36c and 38a-38c) spaced along the length. In addition, the elongated support frames 20 and 22 facilitate mounting the forward ends of diagonal boom braces, described in detail below, directly on the support frames so the entire wing frames 24a and 24b with braces may pivot with the support frames 20 and 22 to the transport position. For implements having a different working width than shown in the figures, the number of hinges and length of the boom support frames may be changed accordingly.

Figure 4:
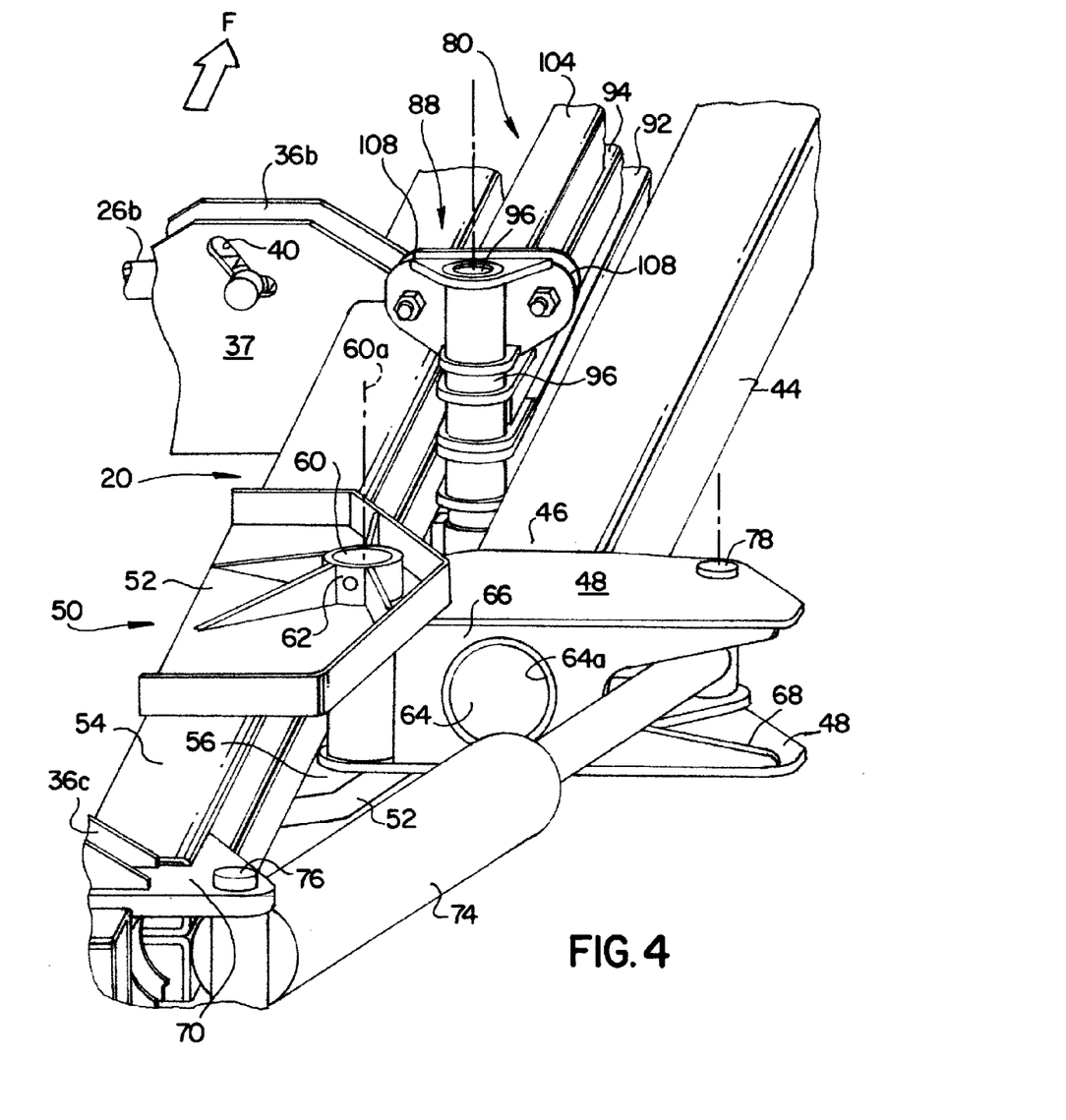
FIG. 4 is an enlarged rear perspective view of the tool support boom pivot area of the structure of FIG. 3 with the boom in the fully folded position to illustrate the flat-fold transport configuration, the compact arrangement of a folding diagonal brace, the torque tube and reinforced pivot area and the extendible fold cylinder connected between an aft end of the boom support frame and the reinforced pivot area.

The right- and left-hand wing frame assemblies 24a and 24b are generally mirror images of each other and identical in construction and therefore only one will be described in full detail below. Each includes an elongated boom 44 fabricated from a tubular member of rectangular cross section. The boom 44 includes an inner end 46 sandwiched between plates 48 of hinge structure 50 (FIGS. 4 and 5). An edge-reinforced, saddle shaped bracket structure 52 is attached to opposite sides of an aft portion of a fore-and-aft extending beam 54 forming a part of the boom support frame (20 of FIGS. 4 and 5). As shown in FIG. 4, the beam 54 is fabricated from a pair of tubular frame members to increase the strength and rigidity of the boom support frame 20 for a given beam cross-section. The bracket structure 52 forms the mating portion of the hinge structure 50 and includes opposed planar surfaces 56 which receive the plates 48 and the inner end 46 therebetween. A pivot pin 60 extends through a reinforced journal area 62 in the bracket structure 52 and through the plates 48 and journal area 62 and defines a boom pivot 60a which assumes a substantially vertical attitude in the field-working position of the boom 44.

As best seen in FIGS. 3 and 4, a torque tube 64 extends through the boom 44 and is secured to the end 46 and to the plates 48 by a hinge end member 66 welded between the plates 48. The end member 66 includes cylinder rod accommodation notch 68. A cylinder bracket 70 is fixed to the aft end of the beam 54 and to the rear hinge structure 36c of the boom support frame 20. A boom fold cylinder 74 includes a cylinder end connected to the bracket 70 by a pivot pin 76. A pivot pin 78 connects the rod end of the cylinder 74 to the plates 48 at a pivot location radially outwardly of the hinge pin 60 and the boom end 46. The bracket structure 52 and the plates 48 are elongated and extend radially from the pin 60 so that in the field-working position of the boom 44 (FIG. 5) an extended aft portion of the plates 48 are sandwiched between the an extended aft portion of the saddle shaped bracket structure 52. In addition, the area of the connection of the end 64a of the torque tube 64 to the hinge structure 50 is closely contained within the opposed planar surfaces 56 of the bracket structure 52. The secure connection of the boom end 46 and the torque tube end 64a within the plates 48, and the sandwiching of the offset portion of the plates 48 in the bracket structure 52 provide a strong boom hinge joint that resists overloads on the pivot pin 60 and journal area 62 as extremely large torsional forces are exerted on the boom 44 while operating in the field.

After the boom support frame 20 is rotated downwardly and outwardly from the position shown in FIG. 3 to the position shown in FIG. 4 by extending the cylinders 26a-26c, the cylinder 74 may be retracted to rotate the boom 44 outwardly to the transverse position shown in FIG. 5. Extending the cylinder 74 returns the boom 44 to the folded position shown in FIG. 4, whereupon the cylinders 26a-26c may be retracted to pivot the boom upwardly and inwardly over the carrier frame 12 (FIG. 3).

To provide positional support for the boom 44 in the unfolded field-working position, a collapsible diagonal brace 80 is connected at a trailing end to an outer end portion 82 of the boom 44 by a boom brace bracket 84 and at a forward end to the forward end of the corresponding boom support frame 20 or 22 by a pivot or ball joint connection 86. The central portion of the brace 80 includes a brace hinge 88 that allows the brace 80 to fold and collapse within itself between the beam 44 and the boom support frame beam 54 (FIG. 4) for a compact, closely aligned folded package. When the boom 44 is unfolded towards the field-working position, the brace 80 automatically unfolds to the position shown in FIGS. 1 and 2 for supporting the boom 44. To prevent the brace 80 from collapsing when the carrier 10 is backed up and tension is removed from the brace, an actuatable brace lock 90 is connected between the brace 80 and the boom 44. Although shown as a cylinder, the brace lock 90 may be a mechanical linkage or any other suitable device for preventing pivoting of the brace 80 relative to the boom 44 when tension is removed from the brace other than during folding.

The diagonal brace 80 may be constructed to additionally reduce torquing of the boom 44 and reduce stresses in brace hinge 88. For example, as shown in FIGS. 1, 2 4 and 6, the brace 80 includes stacked central brace links 92 and 94 connected by a pivot 96 to lower and upper links 102 and 104. The aft ends of the links 102 and 104 are connected to pivot brackets 84a and 84b, respectively, located above and below the boom 44 as seen in FIG. 1. The brace 80 therefore acts as a long lever on the boom 44 acting through a relatively large moment arm to help resist twisting of the boom. To help relieve excessive forces in the brace hinge 88 when the boom 44 moves or twists relative to the boom support frame 20 or 22, the brace hinge 88 may be provided with one or more additional degrees of freedom. One possible embodiment to provide such freedom is shown best in FIG. 6 and includes a generally horizontal pivot (horizontal in the working position of the boom 44) 106 connecting the lower link 102 to the bottom of the pivot 96 and a resilient mount structure 108 connecting the upper link 104 to the upper end of the pivot 96. Other types of connections at various locations on the brace 80 may also be used to provide the desired freedom of motion to allow limited movement of the links 92, 94 and 102, 104 away from a parallel aligned relationship that is normally assumed by the links when the boom frame and boom are in alignment with each other.

When the boom 44 is to be moved from the unfolded working position, the brace lock 90 is first released and the cylinder 74 is extended to pivot the boom 44 forwardly about the upright pivotal axis 60a of the pin 60. The pairs of links 92, 94 and 102, 104 collapse into each other about the pivot 96 (FIG. 4) with the links 92, 94 aligning in parallel relationship with the links 102, 104. As can be appreciated best from FIGS. 3 and 4, the above-described configuration provides a closely stacked compact arrangement including the boom 44, the fold cylinder 74, the brace 88 and the boom frame beam 54.

A rear transversely extending toolbar 110 having a width approximately equal to the width of the frame 12 may be mounted on the aft end 12d of the carrier frame 12. Lift cylinders 112 move the rear toolbar 110 vertically relative to the aft end 12d to adjust the height of the toolbar.

One or more vertically adjustable ground wheel assemblies 114 may be mounted on each of the outer end portions 82 of the booms 44. The wheel assemblies 114 as shown in FIGS. 1 and 2 extend downwardly and forwardly from the boom 44 and include a wheel axis indicated generally at 114a. As illustrated in FIG. 2 on the unfolded assembly 24b, the wheel axis 114a may lie along or near an upright plane that passes through the boom pivot pin 60 and through the wheel assemblies 14 to reduce tire scuffing when the boom 44 is folded about the boom pivot 60a and when the carrier 10 is turned from the forward direction with the boom 44 extended.

When the boom 44 is rotated to the folded position alongside the boom support frame 20 or 22, the axis 114a may be closely adjacent the corresponding boom support frame axis (see, for example, axis 20a in FIGS. 1 and 2). If such an axis location is used with the wheel axis 114a lying close to and generally parallel to the boom support frame axis 20a, the moment arm through which the frame 20 has to operate to move the wheel assemblies 114 upwardly towards the transport position is reduced so that the force required to move the wing frame assembly 24a to the transport or storage position over the frame 12 is reduced compared to assemblies wherein the wheels are offset a greater distance from the pivotal axis.

To help stabilize the boom 44 in the folded position (FIG. 3) brackets 118 may be connected to corresponding boom support frame 20 or 22 to funnel the boom 44 into position and cradle it during transport. The diagonal brace 80 may include similar brackets to stabilize the linkages in the folded position such as are shown adjacent the boom brace bracket 84 and the connection 86 in FIG. 2.

The boom support frames 20 and 22 may be pivoted to an over-center position over the carrier frame 12 for further transport stability of the wing frame assemblies 24a and 24b. Hoppers 120 for containing soil and plant treatments, fertilizer, seeds or the like may be carried on the frame 12 at locations inwardly of the stored wing frame assemblies 24a and 24b. The material in the hoppers 120 may be distributed to the ground by tools 122 and 124 (FIG. 1) extending rearwardly from the rear toolbar 110 and the booms 44. The tools 124 typically are rotated upwardly and inwardly over the frame 12 with the booms 44 as the boom support frames 20 and 22 are pivoted to their storage positions.

While various embodiments of the carrier structure have been specifically described above it is to be understood that many changes and variations will be possible by those skilled in the art and various modifications can be made without departing from the scope of the invention as defined in the accompanying claims.

I claim:

1. An agricultural implement carrier having a working position, a folded position, and a storage position, the carrier comprising:
   (a) a fore-and-aft extending carrier frame defining a center longitudinal axis and having a front, a rear, a left side, and a right side;
   (b) a left wheel structure supporting the carrier frame and having an outermost portion extending outwardly from the left side of the carrier frame;
   (c) a right wheel structure supporting the carrier frame and having an outermost portion extending outwardly from the right side of the carrier frame;
   (d) a left boom support frame pivotally connected to the left side of the carrier frame at two or more spaced apart hinges for pivoting about a single horizontal axis between a working position outwardly of the carrier frame and a storage position above the carrier frame and inwardly of the outermost portion of the left wheel structure;

(e) a right boom support frame pivotally connected to the right side of the carrier frame at two or more spaced apart hinges for pivoting about a single horizontal axis between a working position outwardly of the carrier frame and a storage position above the carrier frame and inwardly of the outermost portion of the right wheel structure;

(f) a left elongated tool support boom having an innermost end pivotally connected to the left boom support frame at a hinge for pivoting about a vertical axis between a working position transverse to the longitudinal axis of the frame and a folded position parallel to the longitudinal axis of the frame and adjacent the left boom support frame;

(g) a right elongated tool support boom having an innermost end pivotally connected to the right boom support frame at a hinge for pivoting about a vertical axis between a working position transverse to the longitudinal axis of the frame and a folded position parallel to the longitudinal axis of the frame and adjacent the right boom support frame;

(h) a left activator connected to the left boom support frame and the left support boom for pivoting the left support boom; and (i) a right activator connected to the right boom support frame and the right support boom for pivoting the right support boom.

2. The carrier, as set forth in claim 1 wherein each boom support frame includes an offset defining with the carrier frame a fore-and-aft extending wheel structure accommodation space, wherein the wheel structure accommodation space is located adjacent the wheel structure to facilitate different size and types of the wheel structure and adjustment of the wheel structure.

3. The carrier as set forth in claim 2 wherein two of the hinges pivotally each boom support frame to the carrier frame are located above and at opposite ends of each wheel structure accommodation space.

4. The carrier as set forth in claim 1 wherein each vertical axis is located adjacent the wheel structure at the innermost end of the tool support boom, wherein each hinge pivotally connecting a boom support frame and a tool support boom includes torque-resisting plates receiving the innermost end of the tool support boom, and wherein the innermost end of each tool support boom is sandwiched between the plates.

5. The carrier as set forth in claim 4 wherein each vertical axis is offset in the direction of travel from an aft end of the carrier and each activator comprises a hydraulic cylinder extendible to rotate each tool support boom forwardly towards the folded position.

6. The carrier as set forth in claim 4 wherein the innermost end of each tool support boom includes an inside portion and a torque tube fixed to the inside portion of the tool support boom and extending between the plates, wherein the torque tube is connected to a hinge plate extending radially from the boom axis, and the hydraulic cylinder includes a rod end connected to the hinge plate.

7. The carrier as set forth in claim 1 wherein each boom support frame is pivotally connected to the carrier frame by hinges located adjacent the front and rear of the carrier frame.

8. The carrier as set forth in claim 1 additionally comprising:

(j) a left diagonal brace connected between the left tool support boom and the left boom support frame, the left diagonal brace including a centrally located brace hinge facilitating folding of the brace between the tool support boom and the boom support frame as the tool support boom moves inwardly from the working position, wherein the diagonal brace is tucked between the tool support boom and the boom support frame when the tool support boom is in the folded position; and (k) a right diagonal brace connected between the right tool support boom and the right boom support frame, the right diagonal brace including a centrally located brace hinge facilitating folding of the brace between the tool support boom and the boom support frame as the tool support boom moves inwardly from the working position, wherein the diagonal brace is tucked between the tool support boom and the boom support frame when the tool support boom is in the folded position.

9. The carrier as set forth in claim 8 wherein each brace hinge includes a joint having at least one resilient joint to accommodate misalignment between the tool support boom and the boom support frame.

10. An agricultural implement carrier including a fore-and-aft extending carrier frame supported by wheel structure for movement in a forward direction over a field by a towing vehicle, a fore-and-aft extending boom support frame pivotally connected to opposite ends of the carrier frame for pivoting about a fore-and-aft frame axis between a working position outwardly of the carrier frame and an upwardly and inwardly directed storage position above the carrier frame, a vertically adjustable rear toolbar connected to the carrier frame for supporting earthworking tools rearwardly of the carrier frame; a tool support boom having an inner boom end and outer boom end portion and supporting earthworking tools; hinge structure pivotally connecting the inner boom end to the boom support frame forwardly of an aft end of the boom support frame and forwardly of the rear toolbar for pivoting about a boom axis, wherein the boom axis is upright when the boom support frame is in the working position, and wherein the hinge structure includes torque-resisting plates receiving the inner end of the tool support boom, wherein inner end of the tool support boom is sandwiched between the plates and includes a torque tube located within the tool support boom and having an innerwardmost tube end secured to the inner boom end between the torque-resisting plates, and an outer tube end secured to the outer boom end portion; a boom fold cylinder located rearwardly of the boom axis, the fold cylinder connected at an aft end to the aft end of the boom support frame and at a forward end to the hinge structure for pivoting the tool support boom about the boom axis outwardly towards an extended position transverse to the working direction when the boom support frame is in the working position, the tool support boom movable inwardly by the boom fold cylinder from the extended position to a fore-and-aft folded position adjacent the carrier frame; a folding diagonal brace connected to a forward end of the boom support frame and to the outer boom end, the diagonal brace including centrally located brace hinge facilitating folding of the brace between tool support boom and the boom support frame as the tool support boom moves inwardly from the extended position, wherein when the tool support boom is in the folded position the diagonal brace is tucked between the tool support boom and the boom support frame, a boom mount offset above and below the tool support boom and connected to the diagonal brace for limiting twisting of the tool support boom, and the brace hinge includes a resilient mount for accommodating misalignment of the tool support boom and the boom support frame; cylinder structure connected between the carrier frame and the boom support frame for pivoting the boom support frame and tool support boom upwardly from the working position to the storage position of the boom support frame when the tool support boom is in the folded position; wherein the carrier frame includes an offset portion defining a wheel accommodation space above the wheel structure and adjacent the hinge structure for facilitating different tire and track sizes and tread widths; and a boom support wheel connected to the outer boom end portion and defining a wheel axis, wherein in the folded position of the boom, the boom support wheel is located forwardly of the boom support frame and wheel axis is adjacent and generally parallel to the frame axis in both the working and storage positions of the boom support frame.

* * * * *